US012610190B2

(12) United States Patent
Tong et al.

(10) Patent No.: US 12,610,190 B2
(45) Date of Patent: Apr. 21, 2026

(54) HEARING EFFECT CALIBRATION METHOD AND APPARATUS FOR EARPHONE, AND DEVICE AND MEDIUM

(71) Applicant: GOERTEK TECHNOLOGY CO., LTD., Shandong (CN)

(72) Inventors: Ziwei Tong, Qingdao (CN); Chunyan Liu, Qingdao (CN); Chen Huang, Qingdao (CN)

(73) Assignee: Goertek Technology Co., Ltd., Qingdao (CN)

( * ) Notice: Subject to any disclaimer, the term of this patent is extended or adjusted under 35 U.S.C. 154(b) by 146 days.

(21) Appl. No.: 18/688,186

(22) PCT Filed: Dec. 18, 2021

(86) PCT No.: PCT/CN2021/139380
§ 371 (c)(1),
(2) Date: Feb. 29, 2024

(87) PCT Pub. No.: WO2023/029301
PCT Pub. Date: Mar. 9, 2023

(65) Prior Publication Data

US 2024/0388849 A1 Nov. 21, 2024

(30) Foreign Application Priority Data

Aug. 30, 2021 (CN) ......................... 202111004402.5

(51) Int. Cl.
*H04R 5/033* (2006.01)
*H04R 1/10* (2006.01)
*H04R 3/00* (2006.01)

(52) U.S. Cl.
CPC ........... *H04R 5/033* (2013.01); *H04R 1/1016* (2013.01); *H04R 3/00* (2013.01); *H04R 2420/07* (2013.01); *H04R 2430/01* (2013.01)

(58) Field of Classification Search
CPC ........ H04R 5/033; H04R 1/1016; H04R 3/00; H04R 2420/07; H04R 2430/01
See application file for complete search history.

(56) References Cited

U.S. PATENT DOCUMENTS

2011/0200217 A1* 8/2011 Gurin ..................... A61B 5/123 381/320
2020/0379713 A1* 12/2020 Carrigan ............... G06F 3/0481

FOREIGN PATENT DOCUMENTS

| | | |
|---|---|---|
| CN | 108989931 A | 12/2018 |
| CN | 113194395 A | 7/2021 |
| CN | 113613147 A | 11/2021 |

* cited by examiner

*Primary Examiner* — Joseph Saunders, Jr.
(74) *Attorney, Agent, or Firm* — Baker Botts LLP

(57) ABSTRACT

The present disclosure discloses a hearing effect calibration method and apparatus for an earphone, an electronic device, and a computer readable storage medium. The method is applied to an adjustment terminal of the earphone and comprises: acquiring hearing thresholds of a first user and a second user; calculating a hearing acuity parameter of the first user relative to the second user based on the hearing thresholds; acquiring a first gain adjustment amount set by the first user who had adjusted a gain of the earphone according to his/her own auditory effect; determining a product of the first gain adjustment amount and the hearing acuity parameter as a second gain adjustment amount; and determining a final gain value of the earphone for the second user based on the second gain adjustment amount.

10 Claims, 3 Drawing Sheets

HEARING EFFECT CALIBRATION METHOD AND APPARATUS FOR EARPHONE, AND DEVICE AND MEDIUM

CROSS-REFERENCE TO RELATED APPLICATIONS

The present disclosure is a National Stage of International Application No. PCT/CN2021/139380, filed on Dec. 18, 2021, which claims priority to a Chinese patent application No. 202111004402.5 filed with the CNIPA on Aug. 30, 2021 and entitled "HEARING EFFECT CALIBRATION METHOD AND APPARATUS FOR EARPHONE, AND DEVICE AND MEDIUM", both of which are hereby incorporated by reference in their entireties.

TECHNICAL FIELD

The present disclosure relates to the field of an earphone, and particularly to a hearing effect calibration method and apparatus for an earphone, an electronic device and a computer readable storage medium.

BACKGROUND

With the rapid development of True Wireless Stereo (TWS) earphones and market competition, the new trend of TWS earphones, assistive listening earphones, has attracted more and more attention from the market and R&D.

In general, the assistive listening earphone achieves the role of assistive listening by enlarging the dynamic range of normal sound and mapping it to the hearing dynamic range of a hearing impairment. Wherein, the gain value used in the amplification is generally determined based on the hearing threshold of hearing impairment in combination with the empirical formula. However, the gain value is a calculated theoretical gain value; while in the actual wearing process, the external environment often causes certain environmental noise. Further, different users may have different ear canal volumes, canal configurations, impedances, etc. (Each person's ear canal has his/her own unique acoustic characteristics), the users generally need to further self-adjust the gain value on the basis of this theoretical gain value in combination with their own auditory experience after wearing the earphone. Especially for children whose ear canals are not yet fully developed, their ear canals are very different from those of adults, and thus the self-adjustment process of gain is more important.

Children or the elderly, however, tend to be less able to operate the related device to perform gain self-adjustment, which reduces the use effectiveness of the earphone. In view of this, it is an urgent concern for those skilled in the art to provide a solution for solving the above technical problems.

SUMMARY

An objective of the present disclosure is to provide a hearing effect calibration method and apparatus for an earphone, an electronic device and a computer readable storage medium, such that the gain of the earphone can be adjusted by others, thereby improving user's experience.

To solve the above technical problem, in an aspect, the present disclosure discloses a hearing effect calibration method for an earphone applied to an adjustment terminal of the earphone, comprising:

acquiring hearing thresholds of a first user and a second user;

calculating a hearing acuity parameter of the first user relative to the second user based on the hearing thresholds;

acquiring a first gain adjustment amount set by the first user who had adjusted a gain of the earphone according to his/her own auditory effect;

determining a product of the first gain adjustment amount and the hearing acuity parameter as a second gain adjustment amount;

determining a final gain value of the earphone for the second user based on the second gain adjustment amount.

Optionally, the adjustment terminal is in communication connection with the earphone through Bluetooth; after said "determining a final gain value of the earphone for the second user based on the second gain adjustment amount", further comprising:

sending the final gain value to the earphone for gain adjustment of the earphone.

Optionally, said "acquiring hearing thresholds of a first user and a second user" comprises:

acquiring minimum audible intensities of the first user and the second user at a plurality of frequency points respectively;

calculating an average of the minimum audible intensities of the first user at the plurality of frequency points as the hearing threshold of the first user;

calculating an average of the minimum audible intensities of the second user at the plurality of frequency points as the hearing threshold of the second user.

Optionally, said "calculating a hearing acuity parameter of the first user relative to the second user based on the hearing thresholds" comprises:

calculating the hearing acuity parameter of the first user relative to the second user according to $R=HL2/HL1$;

wherein, R is the hearing acuity parameter, HL1 is the hearing threshold of the first user, and HL2 is the hearing threshold of the second user.

Optionally, said "calculating a hearing acuity parameter of the first user relative to the second user based on the hearing thresholds" comprises:

calculating the hearing acuity parameter of the first user relative to the second user according to $R=1\ g(HL2)/lg(HL1)$;

wherein, R is the hearing acuity parameter, HL1 is the hearing threshold of the first user, and HL2 is the hearing threshold of the second user.

Optionally, said "calculating a hearing acuity parameter of the first user relative to the second user based on the hearing thresholds" comprises:

calculating the hearing acuity parameter of the first user relative to the second user according to $R=(100-HL1)/(100-HL2)$:

wherein, R is the hearing acuity parameter, HL1 is the hearing threshold of the first user, and HL2 is the hearing threshold of the second user.

In another aspect, the present disclosure discloses a hearing effect calibration apparatus for an earphone applied to an adjustment terminal of the earphone, comprising:

an acquiring module configured for acquiring hearing thresholds of a first user and a second user;

a calculating module configured for calculating a hearing acuity parameter of the first user relative to the second user based on the hearing thresholds;

a receiving module configured for acquiring a first gain adjustment amount set by the first user who had adjusted a gain of the earphone according to his/her own auditory effect:

a determining module configured for determining a product of the first gain adjustment amount and the hearing acuity parameter as a second gain adjustment amount; determining a final gain value of the earphone for the second user based on the second gain adjustment amount.

Optionally, the adjustment terminal is in communication connection with the earphone through Bluetooth; the hearing effect calibration apparatus further comprises:

a sending module configured for after the determining module determines a final gain value of the earphone for the second user based on the second gain adjustment amount, sending the final gain value to the earphone for gain adjustment of the earphone.

Optionally, the acquiring module, when acquiring hearing thresholds of a first user and a second user, is specifically configured for:

acquiring minimum audible intensities of the first user and the second user at a plurality of frequency points respectively;

calculating an average of the minimum audible intensities of the first user at the plurality of frequency points as the hearing threshold of the first user;

calculating an average of the minimum audible intensities of the second user at the plurality of frequency points as the hearing threshold of the second user.

Optionally, the calculating module, when calculating a hearing acuity parameter of the first user relative to the second user based on the hearing thresholds, is specifically configured for:

calculating the hearing acuity parameter of the first user relative to the second user according to R=HL2/HL1;

wherein, R is the hearing acuity parameter, HL1 is the hearing threshold of the first user, and HL2 is the hearing threshold of the second user.

Optionally, the calculating module, when calculating a hearing acuity parameter of the first user relative to the second user based on the hearing thresholds, is specifically configured for:

calculating the hearing acuity parameter of the first user relative to the second user according to R=1 g(HL2)/1 g(HL1);

wherein, R is the hearing acuity parameter, HL1 is the hearing threshold of the first user, and HL2 is the hearing threshold of the second user.

Optionally, the calculating module, when calculating a hearing acuity parameter of the first user relative to the second user based on the hearing thresholds, is specifically configured for:

calculating the hearing acuity parameter of the first user relative to the second user according to R=(100−HL1)/(100−HL2):

wherein, R is the hearing acuity parameter, HL1 is the hearing threshold of the first user, and HL2 is the hearing threshold of the second user.

In yet another aspect, the present disclosure discloses an electronic device, comprising:

a memory configured for storing computer program;

a processor configured for implementing steps of the hearing effect calibration method for an earphone described in any one of the above when executing the computer program.

In yet another aspect, the present disclosure discloses a computer readable storage medium, the computer readable storage medium stores computer program therein, and the computer program, when executed by a processor, implements steps of the hearing effect calibration method for an earphone described in any one of the above.

The hearing effect calibration method and apparatus for an earphone, the electronic device and the computer readable storage medium provided by the present disclosure have the following beneficial effects: based on the relationship between the hearing acuity of the two users, the method can execute calculation based on the fine adjustment amount of the first user to the gain value of the earphone to acquire the fine adjustment amount required by the second user to the gain value of the earphone, so as to make adjustments on behalf of the second user to improve the hearing effect of the earphone for the second user, thereby omitting the similar manual calibration process between different users or different earphones, and greatly improving the calibration efficiency and user's experience.

BRIEF DESCRIPTION OF THE DRAWINGS

In order to clearly illustrate technical solutions of the prior art and embodiments of the present disclosure, accompanying drawings that need to be used in the prior art and embodiments of the present disclosure will be briefly introduced as follows. Of course, the following drawings of the embodiments of the present disclosure describe only some of the embodiments of the present disclosure. For those skilled in the art, other drawings can also be obtained according to the provided drawings without creative efforts, and the obtained drawings also fall within the scope of protection of the present disclosure.

DETAILED DESCRIPTION

The core of the present disclosure is to provide a hearing effect calibration method and apparatus for an earphone, an electronic device and a computer readable storage medium, so that the gain in the earphone can be adjusted by others, thereby improving the use effect of the product.

In order to clearly and completely describe the technical solutions in the embodiments of the present disclosure, the technical solutions in the embodiments of the present disclosure will be described below in conjunction with the drawings in the embodiments of the present disclosure. Based on the embodiments in the present disclosure, all other embodiments obtained by those of ordinary skill in the art without creative work fall within the scope of the present disclosure.

The assistive listening earphone generally achieves the role of assistive listening by enlarging the dynamic range of normal sound and mapping it to the hearing dynamic range of a hearing impairment, and its magnification, that is, the gain value, is generally a rough theoretical value that can be calculated based on empirical formulas. On this basis, the user, when using the assistive listening earphone, generally needs to finely adjust the gain value according to the auditory effect after wearing the earphone. However, some special users, such as the elderly and children, obviously have some difficulties in fine-calibration the gain value by themselves. In view of this, the present disclosure provides a hearing effect calibration solution for an earphone, which can effectively solve the above problem.

Figure 1:
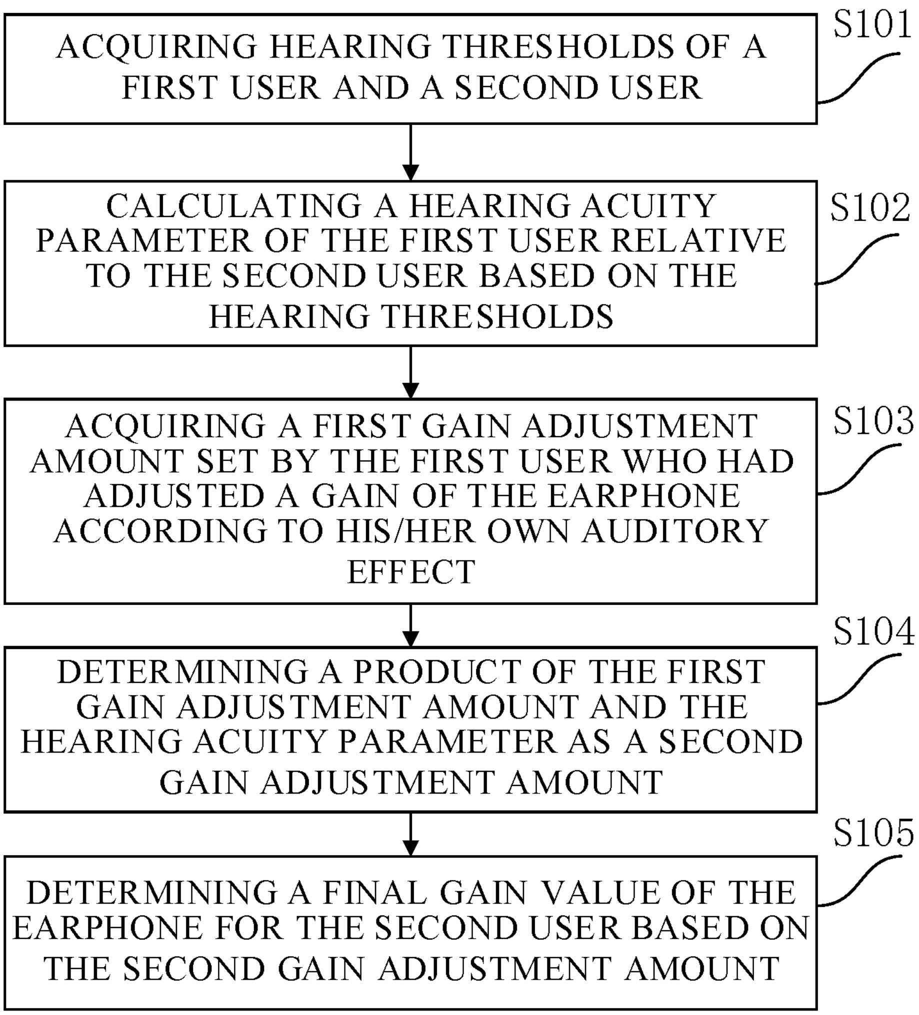
FIG. 1 is a flow chart of a hearing effect calibration method for an earphone disclosed in an embodiment of the present disclosure.

As shown in FIG. 1, an embodiment of the present disclosure discloses a hearing effect calibration method for an earphone applied to an adjustment terminal of the earphone, mainly comprising:

S101: acquiring hearing thresholds of a first user and a second user.

S102: calculating a hearing acuity parameter of the first user relative to the second user based on the hearing thresholds.

S103: acquiring a first gain adjustment amount set by the first user who had adjusted a gain of the earphone according to his/her own auditory effect.

S104: determining a product of the first gain adjustment amount and the hearing acuity parameter as a second gain adjustment amount.

S105: determining a final gain value of the earphone for the second user based on the second gain adjustment amount.

Specifically, the first user in the present disclosure may be a user who can adjust the gain by himself, and the second user may be a user who cannot adjust the gain by himself. The hearing effect calibration method provided by the present disclosure may adjust the gain of the earphone on behalf of the second user according to the gain self-adjustment operation of the first user, so that the hearing effect of the adjusted earphone can be better suitable for the second user.

Wherein, since the self-adjustment of the gain of the earphone by the first user is performed according to the standard that the first user is satisfied with the hearing effect rather than the second user is satisfied with the hearing effect, in order to ensure that the calibration of the present disclosure can really improve the hearing effect for the second user, the present disclosure compares the hearing acuity of the first user with that of the second user in advance. It can be understood that the relationship between the degree to which the first user needs to self-adjust the gain value of the earphone and the degree to which the second user needs to self-adjust the gain value of the earphone is correlated with the relationship between the hearing acuity of the two.

Specifically, the relationship between the hearing acuity of the two users may be expressed in particular on the basis of one parameter: the hearing acuity parameter R of the first user relative to the second user. It will be readily appreciated that the parameter R is the evaluation value of the hearing acuity of the first user based on the hearing acuity of the second user, and may be considered as the multiple of the hearing acuity of the first user relative to the hearing acuity of the second user in some mathematical sense.

Wherein, the hearing acuity parameter between the two users may be calculated specifically based on the hearing thresholds of the two users. The hearing threshold is the minimum audible intensity, in decibels, and refers to the minimum sound intensity that the human ear can just hear, or the minimum sound intensity that a person needs to distinguish the existence of a sound. The range of hearing threshold corresponding to a medically defined mild hearing impairment is 26~40 dB, the range of hearing threshold corresponding to a medically defined moderate hearing impairment is 41~55 dB, the range of hearing threshold corresponding to a medically defined severe hearing impairment is 56~70 dB, and the range of hearing threshold corresponding to a medically defined noise deafness is 71~90 dB.

It will be readily appreciated that the hearing acuity of the user is inversely related to the gain value of the earphone he needs, that is, the higher the hearing acuity of the user, the smaller the gain value for the earphone he needs, while the lower the hearing acuity of the user, the greater the gain value for the earphone he needs. Therefore, if the hearing acuity of the first user is R times that of the hearing acuity of the second user, the self-adjusting amount of the gain value in the earphone by the second user may be R times that of the gain value in the earphone by the first user.

Specifically, if GS1 represents the first gain adjustment amount, that is, the self-adjusting amount that the first user needs to adjust the gain value in the earphone, and if GS2 represents the second gain adjustment amount, that is, the self-adjusting amount that the second user needs to adjust the gain value in the earphone, then there is:

$$GS2 = GS1 \cdot R.$$

Therefore, after determining the second gain adjustment amount, in combination with the rough theoretical value, i.e., the initial gain value G02, calculated based on the experiential formula, the following final gain value G2 required by the second user can be obtained:

$$G2 = G02 + GS2.$$

Furthermore, under the amplification effect of the final gain value G2, the earphone may be well mapped to the hearing dynamic range of the second user, thereby satisfying the auditory effect requirement of the second user. It will be readily appreciated that in order to ensure the adjustment accuracy, the first user may be in the same environment as the second user when he performs fine adjustment on the gain value of the earphone according to the own auditory effect of the first user, so as to reduce the adjustment error caused by the different environmental noise.

It can be seen that based on the relationship between the hearing acuity of the two users, the hearing effect calibration method for an earphone provided by the present disclosure can execute calculation based on the fine adjustment amount of the first user to the gain value of the earphone to acquire the fine adjustment amount required by the second user to the gain value of the earphone, so as to make adjustments on behalf of the second user to improve the hearing effect of the earphone for the second user, thereby omitting the similar manual calibration process between different users or different earphones, and greatly improving the calibration efficiency and user's experience.

Figure 2:
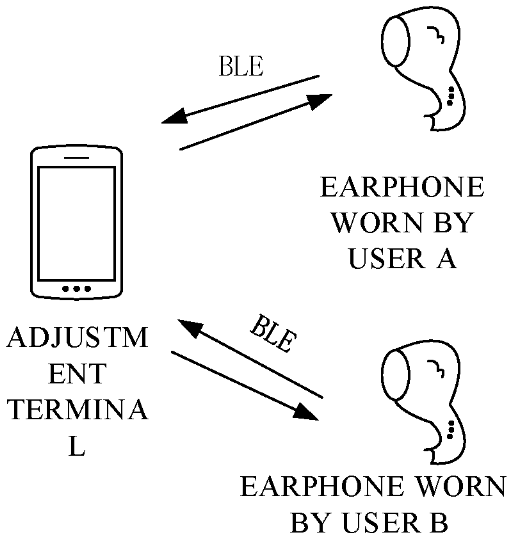
FIG. 2 is an application scene diagram of a hearing effect calibration method for an earphone disclosed in an embodiment of the present disclosure.

As shown in FIG. 2, it is an application scene diagram of a hearing effect calibration method for an earphone disclosed in an embodiment of the present disclosure. Specifically, a pair of earphones includes two earphones, which can be worn by different users respectively, wherein the user A is a first user, and the user B is a second user. The two earphones are both in communication connection with the same adjustment terminal through Bluetooth Low Energy (BLE). The adjustment terminal may specifically be a terminal device such as a smart phone. In this way, after the user A performs hearing effect adjustment on the earphone worn by the user A through manual calibration, the adjustment terminal may adjust the earphone worn by the user B according to the method disclosed by the present disclosure, thereby realizing the synchronous adjustment of the two earphones.

It should be noted that the hearing effect calibration method for an earphone provided by the present disclosure may also be applied to another application scene; if two pairs of earphones of the same user both need to be performed hearing effect calibration, then the adjustment terminal may be in communication connection with the two pairs of earphones, and according to the manual calibration result of the first pair of earphones by the user, the hearing effect adjustment is automatically performed on the second pair of earphones, therefore realizing the synchronous adjustment on the two pairs of earphones.

As an specific embodiment, on the basis of the above content of the hearing effect calibration method for an earphone provided by the present disclosure, the adjustment terminal is in communication connection with Bluetooth; after said "determining a final gain value of the earphone for the second user based on the second gain adjustment amount", further comprising:

sending the final gain value to the earphone for gain adjustment of the earphone.

The adjustment terminal can specifically send the final gain value of the second user to the earphone of the second user through BLE. The related program in the earphone can adjust the amplification gain of the audio signal with the final gain value as a parameter, so as to achieve a hearing effect suitable for the second user. In the whole adjustment process, the second user does not need to perform any operation, thus greatly facilitating the use of the earphone by the second user without the ability to adjust operations.

As an specific embodiment, on the basis of the above content of the hearing effect calibration method for an earphone provided by the present disclosure, said "acquiring hearing thresholds of a first user and a second user" comprises:

acquiring minimum audible intensities of the first user and the second user at a plurality of frequency points respectively:

calculating an average of the minimum audible intensities of the first user at the plurality of frequency points as the hearing threshold of the first user;

calculating an average of the minimum audible intensities of the second user at the plurality of frequency points as the hearing threshold of the second user.

Specifically, considering that the same user has different hearing acuities for different frequency signals, the present disclosure may specifically employ a method of averaging multiple frequency point measurements when determining the hearing thresholds of the first user and the second user, so as to further improve the accuracy of data.

In general, a person skilled in the art may specifically select the three frequency points of 500 Hz, 1000 Hz, and 2000 Hz. The minimum audible intensity is the minimum sound intensity required for a person to be able to distinguish the presence of a sound. For each frequency point, the tester can let the testee listen to the audio signals of the same frequency with different decibels, and the decibel that the testee can just perceive the existence of the audio signal is the minimum audible intensity at the frequency point. After measuring the minimum audible intensities at three frequency points, the average value can be obtained as the hearing threshold of the user. As an specific embodiment, on the basis of the above content of the hearing effect calibration method for an earphone provided by the present disclosure, said "calculating a hearing acuity parameter of the first user relative to the second user based on the hearing thresholds" comprises:

calculating the hearing acuity parameter of the first user relative to the second user according to $R=HL2/HL1$;

wherein, R is the hearing acuity parameter, HL1 is the hearing threshold of the first user, and HL2 is the hearing threshold of the second user.

Specifically, the hearing acuity parameter of one user with respect to another user is not a definition with an explicit quantitative calculation, and this embodiment may specifically take HL2/HL1 as the hearing acuity parameter of the first user relative to the second user. If R is greater than 1, it means that the hearing acuity of the first user is better than that of the second user; on the contrary, if R is less than 1, it means that the hearing acuity of the first user is weaker than that of the second user.

Hereinafter, the hearing effect calibration method for an earphone of the present disclosure will be described with reference to a specific example.

Specifically, it is assumed that the hearing threshold of the first user is HL1=30 dB, and the hearing threshold of the second user is HL2=50 dB; according to the empirical formula and the hearing threshold of each user, the obtained initial gain values of the first user are G01=5 dB and G02=25 dB.

Thus, the hearing acuity parameter of the first user relative to the second user can be calculated as $R=HL2/HL1=5/3$.

Then, in the current environment, the first user, after wearing the earphone, tries to fine-tune the gain value of the earphone on the adjustment terminal in combination with the own auditory effect, and finally obtains the first gain adjustment amount GS1=3 dB when the hearing effect is satisfied.

Thus, it can be calculated that the second gain adjustment amount required by the second user is $GS2=GS1\cdot R=5$ dB.

Then, the final gain value required by the second user can be calculated to be $G2=G02+GS2=30$ dB.

As an specific embodiment, on the basis of the above content of the hearing effect calibration method for an earphone provided by the present disclosure, said "calculating a hearing acuity parameter of the first user relative to the second user based on the hearing thresholds" comprises:

calculating the hearing acuity parameter of the first user relative to the second user according to $R=\lg(HL2)/\lg(HL1)$;

wherein, R is the hearing acuity parameter, HL1 is the hearing threshold of the first user, and HL2 is the hearing threshold of the second user.

Specifically, the present embodiment specifically takes LG(HL2)/LG(HL1) as the hearing acuity parameter of the first user relative to the second user. If the above example is still used as an example, the R calculated at this time will become lg50/lg30.

As an specific embodiment, on the basis of the above content of the hearing effect calibration method for an earphone provided by the present disclosure, said "calculating a hearing acuity parameter of the first user relative to the second user based on the hearing thresholds" comprises:

calculating the hearing acuity parameter of the first user relative to the second user according to $R=(100-HL1)/(100-HL2)$;

wherein, R is the hearing acuity parameter, HL1 is the hearing threshold of the first user, and HL2 is the hearing threshold of the second user.

Specifically, since 100 dB is already an unbearable noise decibels, the present embodiment specifically takes (100−HL1)/(100−HL2) as the hearing acuity parameter of the first user relative to the second user. If the above example is still used as an example, the R calculated at this time will become R=7/5.

In summary, the hearing acuity parameter of the first user relative to the second user in the present disclosure can be calculated in a variety of specific ways, as long as the reverse change trend between the hearing acuity parameter and the hearing threshold is guaranteed, which is not limited in the present disclosure.

Figure 3:
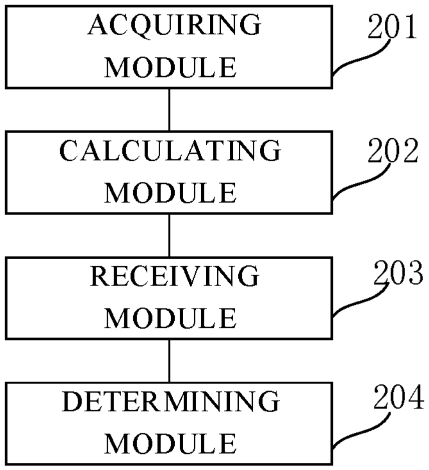
FIG. 3 is a structural block diagram of a hearing effect calibration apparatus of an earphone disclosed in an embodiment of the present disclosure.

As shown in FIG. 3, an embodiment of the present disclosure discloses a hearing effect calibration apparatus for an earphone applied to an adjustment terminal of the earphone, mainly comprising:

an acquiring module 201 configured for acquiring hearing thresholds of a first user and a second user;

a calculating module 202 configured for calculating a hearing acuity parameter of the first user relative to the second user based on the hearing thresholds;

a receiving module 203 configured for acquiring a first gain adjustment amount set by the first user who had adjusted a gain of the earphone according to his/her own auditory effect;

a determining module 204 configured for determining a product of the first gain adjustment amount and the hearing acuity parameter as a second gain adjustment amount; determining a final gain value of the earphone for the second user based on the second gain adjustment amount.

It can be seen that based on the relation between the hearing acuities of the two users, the hearing effect calibration apparatus for an earphone provided by the embodiment of the present disclosure can execute calculation based on the fine adjustment amount of the first user to the gain value of the earphone to acquire the fine adjustment amount required by the second user to the gain value of the earphone, so as to make adjustments on behalf of the second user to improve the hearing effect of the earphone for the second user, thereby omitting the similar manual calibration process between different users or different earphones, and greatly improving the calibration efficiency and user's experience.

For details of the above hearing effect calibration apparatus for an earphone, reference may be made to the foregoing detailed description of the hearing effect calibration method for an earphone, which will not be repeated herein.

As a specific embodiment, based on the above content about the hearing effect calibration apparatus for an earphone provided by the embodiment of the present disclosure, the adjustment terminal is in communication connection with the earphone through Bluetooth; the hearing effect calibration apparatus further comprises:

a sending module configured for after the determining module determines a final gain value of the earphone for the second user based on the second gain adjustment amount, sending the final gain value to the earphone for gain adjustment of the earphone.

As a specific embodiment, based on the above content about the hearing effect calibration apparatus for an earphone provided by the embodiment of the present disclosure, the acquiring module 201, when acquiring hearing thresholds of a first user and a second user, is specifically configured for;

acquiring minimum audible intensities of the first user and the second user at a plurality of frequency points respectively;

calculating an average of the minimum audible intensities of the first user at the plurality of frequency points as the hearing threshold of the first user;

calculating an average of the minimum audible intensities of the second user at the plurality of frequency points as the hearing threshold of the second user.

As a specific embodiment, based on the above content about the hearing effect calibration apparatus for an earphone provided by the embodiment of the present disclosure, the calculating module 202, when calculating a hearing acuity parameter of the first user relative to the second user based on the hearing thresholds, is specifically configured for:

calculating the hearing acuity parameter of the first user relative to the second user according to R=HL2/HL1;

wherein, R is the hearing acuity parameter, HL1 is the hearing threshold of the first user, and HL2 is the hearing threshold of the second user.

As a specific embodiment, based on the above content about the hearing effect calibration apparatus for an earphone provided by the embodiment of the present disclosure, the calculating module 202, when calculating a hearing acuity parameter of the first user relative to the second user based on the hearing thresholds, is specifically configured for:

calculating the hearing acuity parameter of the first user relative to the second user according to R=lg HL2)/lg(HL1);

wherein, R is the hearing acuity parameter, HL1 is the hearing threshold of the first user, and HL2 is the hearing threshold of the second user.

As a specific embodiment, based on the above content about the hearing effect calibration apparatus for an earphone provided by the embodiment of the present disclosure, the calculating module 202, when calculating a hearing acuity parameter of the first user relative to the second user based on the hearing thresholds, is specifically configured for:

calculating the hearing acuity parameter of the first user relative to the second user according to R=(100−HL1)/(100−HL2);

wherein, R is the hearing acuity parameter, HL1 is the hearing threshold of the first user, and HL2 is the hearing threshold of the second user.

Figure 4:
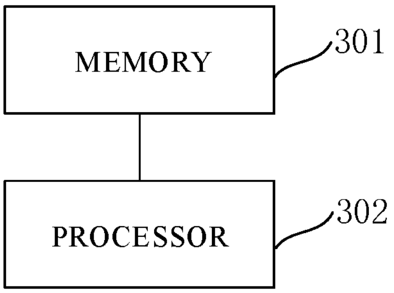
FIG. 4 is a structural block diagram of an electronic device disclosed in an embodiment of the present disclosure.

As shown in FIG. 4, an embodiment of the present disclosure discloses an electronic device, comprising:

a memory 301 configured for storing computer program;

a processor 302 configured for implementing steps of the hearing effect calibration method for an earphone described in any one of the above when executing the computer program.

Further, an embodiment of the present disclosure further discloses a computer readable storage medium, the computer readable storage medium stores computer program therein, and the computer program, when executed by a processor, implements steps of the hearing effect calibration method for an earphone described in any one of the above.

For details of the above electronic device and the computer readable storage medium, reference may be made to the foregoing detailed description of the hearing effect calibration method for an earphone, which will not be repeated herein.

Each embodiment in this specification is described in a progressive manner, and each embodiment focuses on its differences from other embodiments, and the similar parts between each embodiment can refer to each other. For the device disclosed in the embodiments, the description is relatively simple because the device corresponds to the method disclosed in the embodiments, and the relevant points can be found in the description of the method.

It should also be noted that in this article, relational terms such as "first" and "second", etc., are used solely to distinguish one entity or operation from another, and do not necessarily require or imply any such actual relationship or sequence between those entities or operations. Further, the term "comprise", "include" or any other variation thereof is intended to cover non-exclusive comprising so that a process, method, article or apparatus that comprises a series of elements includes not only those elements, but also other elements that are not expressly listed, or also comprises elements inherent in such process, method, article or apparatus. Without further limitation, the elements defined by the phrase "comprising a . . . " do not preclude the existence of other identical elements in the process, method, article or apparatus that includes the elements.

The technical solution provided by the present disclosure has been described in detail above. Specific examples are applied herein to illustrate the principles and implementations of the present disclosure, and the description of the above embodiment is only for the purpose of helping to understand the method of the present disclosure and its core ideas. It should be noted that, for those of ordinary skill in the art, on the premise of not departing from the principles of the present disclosure, certain improvements and modifications may also be made to the present disclosure, and these improvements and modifications also fall within the scope of protection of the present disclosure.

The invention claimed is:

1. A hearing effect calibration method for an earphone, being applied to an adjustment terminal of the earphone, the method comprising:

acquiring hearing thresholds of a first user and a second user;

calculating a hearing acuity parameter of the first user relative to the second user based on the hearing thresholds;

acquiring a first gain adjustment amount set by the first user who had adjusted a gain of the earphone according to his/her own auditory effect;

determining a product of the first gain adjustment amount and the hearing acuity parameter as a second gain adjustment amount; and determining a final gain value of the earphone for the second user based on the second gain adjustment amount.

2. The hearing effect calibration method for an earphone according to claim 1, wherein the adjustment terminal is in communication connection with the earphone through Bluetooth; after said determining a final gain value of the earphone for the second user based on the second gain adjustment amount, further comprising:

sending the final gain value to the earphone for a gain adjustment of the earphone.

3. The hearing effect calibration method for an earphone according to claim 2, wherein said acquiring hearing thresholds of a first user and a second user, comprises:

acquiring minimum audible intensities of the first user and the second user at a plurality of frequency points respectively;

calculating an average of the minimum audible intensities of the first user at the plurality of frequency points as the hearing threshold of the first user; and calculating an average of the minimum audible intensities of the second user at the plurality of frequency points as the hearing threshold of the second user.

4. The hearing effect calibration method for an earphone according to claim 1, wherein said calculating a hearing acuity parameter of the first user relative to the second user based on the hearing thresholds, comprises:

calculating the hearing acuity parameter of the first user relative to the second user according to $R=HL2/HL1$;

wherein, R is the hearing acuity parameter, HL1 is the hearing threshold of the first user, and HL2 is the hearing threshold of the second user.

5. The hearing effect calibration method for an earphone according to claim 1, wherein said calculating a hearing acuity parameter of the first user relative to the second user based on the hearing thresholds, comprises:

calculating the hearing acuity parameter of the first user relative to the second user according to $R=\lg(HL2)/\lg(HL1)$;

wherein, R is the hearing acuity parameter, HL1 is the hearing threshold of the first user, and HL2 is the hearing threshold of the second user.

6. The hearing effect calibration method for an earphone according to claim 1, wherein said calculating a hearing acuity parameter of the first user relative to the second user based on the hearing thresholds, comprises:

calculating the hearing acuity parameter of the first user relative to the second user according to $R=(100-HL1)/(100-HL2)$;

wherein, R is the hearing acuity parameter, HL1 is the hearing threshold of the first user, and HL2 is the hearing threshold of the second user.

7. An electronic device, comprising:

a memory configured for storing computer program;

a processor configured for implementing a method according to claim 1 when executing the computer program.

8. A computer readable storage medium, wherein the computer readable storage medium stores computer program therein, and the computer program, when executed by a processor, implements a method according to claim 1.

9. A hearing effect calibration apparatus for an earphone, being applied to an adjustment terminal of the earphone, comprising:

an acquiring module configured for acquiring hearing thresholds of a first user and a second user;

a calculating module configured for calculating a hearing acuity parameter of the first user relative to the second user based on the hearing thresholds;

a receiving module configured for acquiring a first gain adjustment amount set by the first user who had adjusted a gain of the earphone according to his/her own auditory effect; and a determining module configured for determining a product of the first gain adjustment amount and the hearing acuity parameter as a second gain adjustment amount; determining a final gain value of the earphone for the second user based on the second gain adjustment amount.

10. The hearing effect calibration apparatus for an earphone according to claim 9, wherein the adjustment terminal is in communication connection with the earphone through Bluetooth; the hearing effect calibration apparatus further comprises:

a sending module configured for, after the determining module determines a final gain value of the earphone for the second user based on the second gain adjustment amount, sending the final gain value to the earphone for a gain adjustment of the earphone.

* * * * *